Dec. 23, 1969  W. McCANDLESS  3,484,889
SWEEPER FILTER
Filed Sept. 25, 1967  2 Sheets-Sheet 1
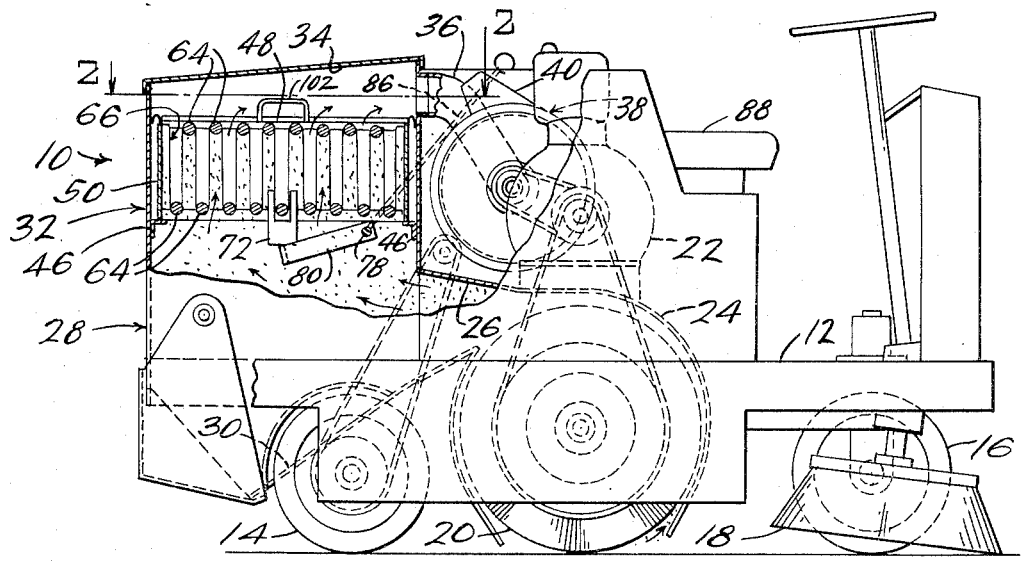
FIG-1
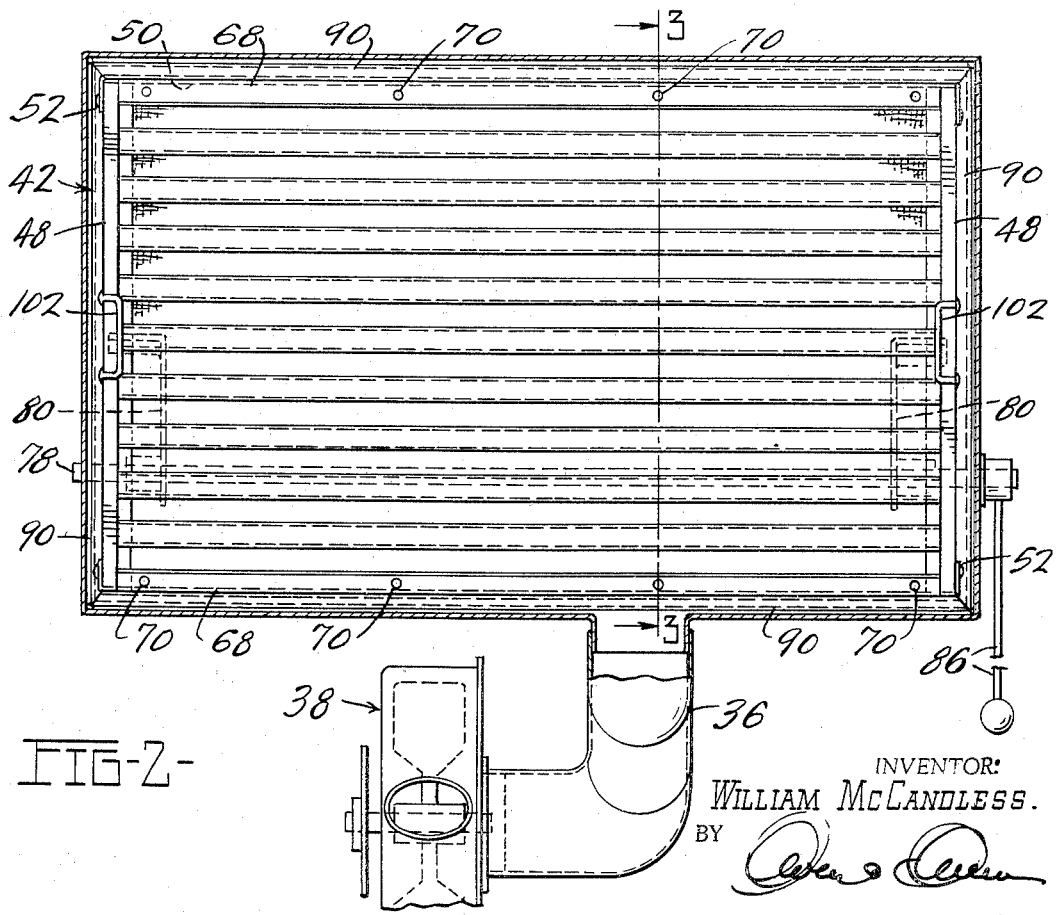
FIG-2
INVENTOR:
WILLIAM McCANDLESS.
BY
ATT'YS.

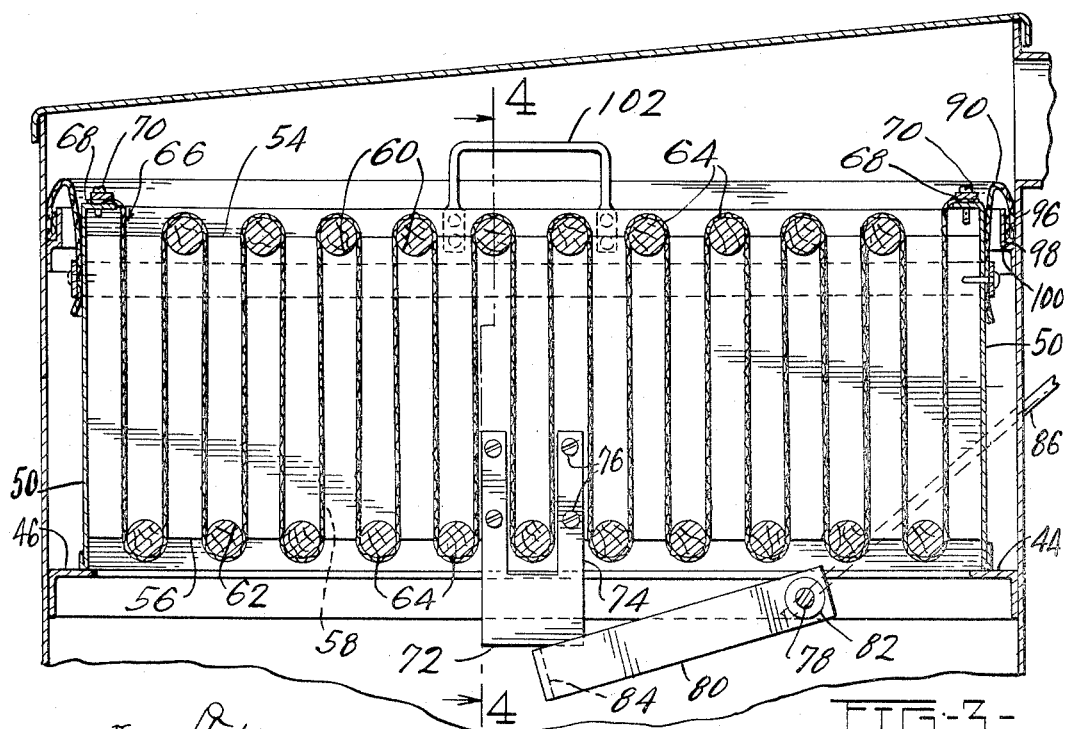
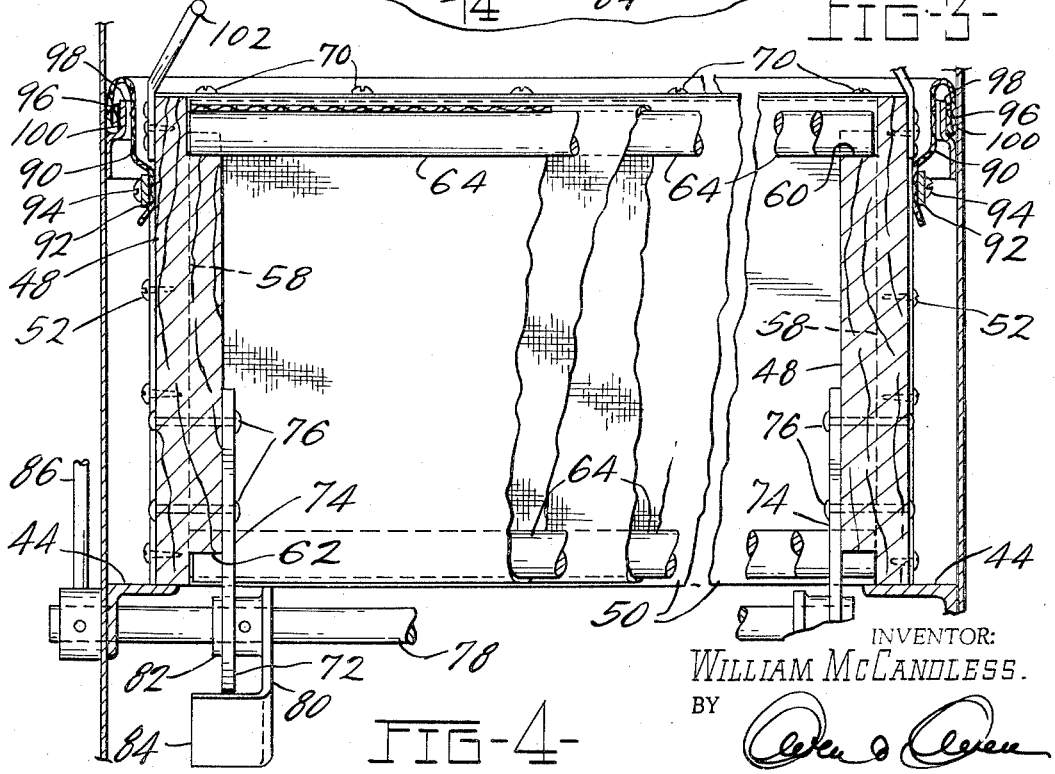

United States Patent Office 3,484,889
Patented Dec. 23, 1969

3,484,889
SWEEPER FILTER
William McCandless, Toledo, Ohio, assignor, by mesne assignments, to The Scott & Fetzer Company, Lakewood, Ohio, a corporation of Ohio
Filed Sept. 25, 1967, Ser. No. 670,336
Int. Cl. E01h 1/04, 1/05
U.S. Cl. 15—340                           3 Claims

ABSTRACT OF THE DISCLOSURE

A compact, low-cost filter for a power sweeper is provided. The filter includes a box frame and filter cloth which are simple and inexpensive. The overall filter fits compactly with the other components of the sweeper so that the overall dimensions thereof can be held to a minimum. The filter also includes a shaker mechanism which a sweeper operator can manipulate to shake and clean the filter without leaving his seat. In addition, the filter can be quickly removed from the sweeper for cleaning or replacement.

---

This invention relates to a power sweeper and specifically to an improved filter therefor.

Filters of several designs have been proposed heretofore for power sweepers, as well as other sweepers. These generally have been of relatively cumbersome size and design in order to provide a large filtering area. These filters also have been of relatively complicated and expensive construction and cleaning thereof usually has been inconvenient.

The present invention provides a new filter for a sweeper and particularly for a compact, riding-type power sweeper. The filter is constructed in a manner such that its height is relatively low and it is designed to fit into the dirt-receiving hopper in a manner such as to add little additional height to the overall sweeper. The filter is also of simple construction so as to be low in cost and also require little maintenance.

The filter includes a box frame fitting within an upper portion of the hopper which can be of inexpensive construction. The filtering material constitutes a filter cloth which is located in a zigzag manner across the frame to provide a high degree of filtering area in a minimum overall volume. A shaker mechanism which includes a lever extending to a position beside the operator's seat enables the operator periodically to clean the filter simply by moving the lever and without even leaving the seat. The lever includes arms which engage the box frame and enable it to be moved violently vertically to shake a high percentage of the dust from the filtering cloth into the bottom of the hopper.

It is, therefore, a principal object of the invention to provide an improved filter for a sweeper having the advantages discussed above.

Many other objects and advantages of the invention will be apparent from the following detailed description of a preferred embodiment thereof, reference being made to the accompanying drawings in which:

FIG. 1 is a somewhat schematic side view in elevation, with parts broken away and with parts in section, of a power sweeper employing a filter in accordance with the invention;

FIG. 2 is a horizontal sectional view of a hopper filter taken along the line 2—2 of FIG. 1;

FIG. 3 is a view in vertical, transverse cross section taken along the line 3—3 of FIG. 2; and FIG. 4 is a fragmentary, vertical, sectional view, with parts broken away, of the filter, showing certain additional details thereof.

Referring particularly to FIG. 1, a power sweeper embodying the invention is indicated at 10 and includes a main chassis or frame 12, wheels 14 and 16, a side broom 18, and a main broom 20. As shown, the main broom 20 is rotated in a counterclockwise direction by a motor 22 to pick up dirt from the surface being cleaned and carry it, in a housing 24, to a chute 26 which communicates with a dirt-receiving hopper 28. Air is drawn into the housing 24 to aid the main broom 20 in moving the dirt and dust through the chute 26 and into the hopper 28. Heavier airborne dirt then settles to a bottom 30 of the hopper while lighter air-borne dirt or dust is carried with the air to a filter 32 embodying the invention. Here the dust is intercepted and the air is drawn through the filter and a plenum chamber 34 to an inlet line 36 connected with an inlet of a blower 38. The blower 38 has suitable fan blades which are also driven by the motor 22 with the air ejected rearwardly through an outlet 40.

The overall sweeper 10 is relatively compact and also of low-cost construction. The filter 32 aids in achieving these overall results for the sweeper in that the filter itself also is low in cost and compact, with the overall height of the hopper 28 being no higher than the other sweeper components.

Referring particularly to FIGS. 2-4, the filter 32 includes a box frame 42 which is supported in the hopper 28 on side flanges 44 (FIG. 4) and end flanges 46 (FIG. 3). The box frame 42 includes two relatively thick side frame members 48 which can be made of one-inch thick wood, for example, and sheet metal end frame members 50 which are suitably fastened to the side frame members by screws 52 (FIG. 4). The side frame members 48 have upper and lower shoulders 54 and 56 between which extend a plurality of vertical grooves or slots 58 (FIG. 3) which preferably have a depth equal to the width of the shoulders 54 and 56. The shoulders 54 and 56 also have spaced notches 60 and 62 which are positioned substantially tangentially between alternate pairs of the slots 58. Transverse supports or rods 64, shown as being circular in cross section, extend across the frame 42 between the side frame members 48, with the ends received in the respective notches 60 and 62 to position the rods with respect to the slots. The rods 64 can be of a variety of other shapes and, for example, can be square with end portions resting directly on the shoulders 54 and 56, without the notches.

A sheet 66 of a flexible filter media or cloth extends around the rods 64 with ends being affixed to the end frame members 50 by straps 68 and screws 70. The filter sheet 66 has edge portions extending into the slots 58 so as to completely cover the opening formed by the frame members 48 and 50, with the edge portions hemmed, if desired. The zigzag pattern of the filter sheet 66 as it extends across the opening provides a very large filtering area relative to the opening size to enable dust to be effectively collected thereby without causing undue pressure drop thereacross.

Even though the flexible filter sheet 66 has a large area, dust will eventually impair its permeability excessively, thereby requiring cleaning. For this purpose, each of the side frame members 48 has a U-shaped bearing plate 72 affixed thereto with legs 74 extending upwardly on each side of one of the supporting rods 64 and affixed to the side frame member by fasteners 76. The bearing plate 72 extends downwardly below the lower edge of the filtering unit and also below the flanges 44.

A shaft 78 extends across the hopper 28, between the side walls thereof, and carries two arms 80 having hubs 82 affixed to the shaft 78. The arms 80 have end flanges 84 which can push on the lower edges of the bearing plates 72 to cause the plates 72 and the entire filter 32 to move upwardly when the arms are moved in a clockwise direction, as shown in FIG. 3. Movement of the arms 80 is caused by an operating lever 86 located at one side of the hopper with this lever extending upwardly to a position just to the rear of an operator's seat 88, as shown in FIG. 1. With this arrangement, the operator can grasp the lever 86 and oscillate it rapidly to cause the arms 80 to engage the plates 72 and move the filtering unit 32 upwardly and downwardly rapidly, causing the frame 42 to drop relatively sharply on the flanges 44 and 46, if desired.

The filter frame 42 can move without air bypassing the filter, between the filter and the hopper walls. To accomplish this, flexible strips 90 extend longitudinally of the side frame members 48, being affixed thereto by straps 92 and fasteners 94. The flexible strips 90 have thick edge portions 96 which are received in grooves or slots 98 formed between the hopper side walls and flange members 100. Similar strips and connections are formed between the end frame members 50 and the hopper end walls, as shown in FIG. 3. This construction also enables the entire filter 32 to be removed from the hopper with the aid of handles 102, with the flexible edge strips 90 being pulled out of the recesses 98 in which they can be held by a friction fit. The filter sheet 66 can then be washed, cleaned with an air hose, etc., or replaced, as needed.

From the above, it will be seen that the filter 32 embodying the invention is of compact and simple construction, threby providing many advantages over filters heretofore known. The easy and quick arrangement for shaking and cleaning the filter 32, without the operator leaving the seat, also is of considerable advantage in facilitating the cleaning operation.

I claim:

1. A power sweeper for sweeping a surface comprising a main frame, wheels rotatably mounted on said frame for driving and steering said sweeper, a main broom rotatably held by said sweeper, wall means forming a hopper carried by said frame and having an opening communicating with said main broom, a blower carried by said sweeper and having an opening communicating with said hopper at a point spaced from said broom opening to draw air past said broom and through said hopper, a filter positioned in said hopper between said broom opening and said blower opening, said filter including a rigid frame, flexible filter sheet means extending across said filter frame, supporting means attached to said hopper wall means for supporting a lower peripheral edge portion of said filter frame, flexible air-resistant means connected between the entire periphery of said filter frame and said wall means to inhibit movement of air between said frame and said wall means and yet enable said frame to move relative to said supporting means, said flexible air-resistant means being releasably connected to one of said filter frames and said wall means to enable said frame to be removed from said hopper, means supported by said hopper wall means and engageable with a lower portion of said rigid frame to raise said frame and said air-resistant means above said supporting means and to enable said frame to drop onto said supporting means.

2. A sweeper according to claim 1 characterized further by said flexible means being attached to said filter frame and having thick edge means, and groove means formed on said hopper wall means to receive and frictionally hold said edge means, said edge means and said groove means constituting the releasable connection between said flexible means and said hopper wall means.

3. A power sweeper for sweeping a large surface comprising a main frame, wheels rotatably mounted on said frame for driving and steering said sweeper, an operator's seat supported by said frame and said wheels, a main broom rotatably held by said frame, wall means forming a hopper carried by said frame having an opening for receiving dirt from said main broom, a blower carried by said sweeper and having an opening communicating with said hopper at a point spaced from said dirt-receiving opening to draw air past said broom and through the hopper, a filter extending across said hopper between said dirt-receiving opening and said blower opening, said filter including a rigid frame, a supporting flange affixed to said hopper wall means and extending inwardly for supporting a peripheral lower edge portion of said filter frame thereon, flexible means connected between said filter frame and said hopper wall means to inhibit flow of air between said frame and said wall means and yet enable said filter frame to move upwardly relative to said supporting means, a pair of engageable members carried by said frame and extending downwardly below the lower edge portion of said frame adjacent side walls of said hopper wall means, a pair of arms, a shaft extending across the hopper and carrying said arms below said engageable members of said filter frame, one end of said shaft extending outside said hopper, and an operating lever functionally integral with said one end of said shaft and extending to a position near an operator's seat of said sweeper to enable the operator to grasp and oscillate the lever thereby to oscillate said shaft and cause said arms to move said filter and said filter frame up and down relative to said supporting means.

References Cited
UNITED STATES PATENTS

| | | | |
|---|---|---|---|
| 1,268,304 | 6/1918 | Warren | 55—300 |
| 1,459,968 | 6/1923 | Bailly | 15—347 X |
| 3,160,908 | 12/1964 | Peabody et al. | 15—340 |
| 3,186,021 | 6/1965 | Krier et al. | 15—340 |
| 1,610,119 | 12/1926 | Butler | 15—352 X |

ROBERT W. MICHELL, Primary Examiner

U.S. Cl. X.R.
15—352; 55—305